(12) United States Patent
Adriany et al.

(10) Patent No.: US 6,405,135 B1
(45) Date of Patent: Jun. 11, 2002

(54) SYSTEM FOR REMOTE DETECTION AND NOTIFICATION OF SUBTERRANEAN POLLUTANTS

(76) Inventors: John J. Adriany, 3022 Elliot St., San Diego, CA (US) 92106; Brian M. Kahl, 2701 Serene Way, Jamul, CA (US) 91935; Scott S. Fenby, 10203 Pinecastle St., San Diego, CA (US) 92131

( * ) Notice: Subject to any disclaimer, the term of this patent is extended or adjusted under 35 U.S.C. 154(b) by 119 days.

(21) Appl. No.: 09/619,057

(22) Filed: Jul. 18, 2000

(51) Int. Cl.[7] ............................................... G06F 19/00
(52) U.S. Cl. ............................................. 702/5; 702/22
(58) Field of Search .......................... 702/2, 5, 12, 13, 702/22, 23; 706/930

(56) References Cited

U.S. PATENT DOCUMENTS

| | | |
|---|---|---|
| 4,305,068 A | 12/1981 | Klein |
| 4,384,925 A | 5/1983 | Stetter et al. |
| 4,390,869 A | 6/1983 | Christen et al. |
| 4,404,516 A | 9/1983 | Johnson, Jr. |
| 4,618,855 A | 10/1986 | Harding et al. |
| 4,668,939 A | 5/1987 | Kimura et al. |
| 5,010,776 A | 4/1991 | Lucero et al. |
| 5,202,667 A | 4/1993 | Alvin |
| 5,264,833 A | 11/1993 | Jeffers et al. |
| 5,347,850 A | 9/1994 | Tuma |
| 5,363,093 A | 11/1994 | Williams et al. |
| 5,417,100 A | 5/1995 | Miller et al. |
| 5,435,169 A | 7/1995 | Mitra |
| 5,469,369 A | 11/1995 | Rose-Pehrsson et al. |
| 5,499,196 A | 3/1996 | Pacheco |
| 5,831,876 A * | 11/1998 | Orr et al. ..................... 706/930 |
| 5,832,411 A | 11/1998 | Schatzmann et al. |
| 5,892,690 A | 4/1999 | Boatman et al. |
| 5,914,656 A | 6/1999 | Ojala et al. |

* cited by examiner

*Primary Examiner*—Donald E. McElheny, Jr.
(74) *Attorney, Agent, or Firm*—Charles F. Reidelbach, Jr.; Higgs, Fletcher & Mack LLP

(57) ABSTRACT

An imbedded Internet sensor system for protecting real property from the consequences of subterranean chemical pollution. The system provides real time monitoring of the first occurrence of contaminants in the subsurface of a property. An onsite processor controls a local network of sensors and a communication device relays the data to a remotely located database. The local network of sensor are made up of multiple acoustic wave sensors differentiated by sensor coatings configured into a sensor array. As a vapor contaminant passes across the surface of the surface acoustic wave sensor crystals, a shift is caused in the frequency of the acoustic wave. The shift is translated into an electronic signal that is communicated to the onsite processor, which in turn communicates the signal in the form of electronic data to a remote facility wherein remedial measures may be dispatched and appropriate parties notified. The method of dispatch and notification is provided by a Web site system accessible through the Internet. The system is provided as part of a pollution detection and notification service for which a customer pays a subscription fee.

44 Claims, 4 Drawing Sheets

SYSTEM FOR REMOTE DETECTION AND NOTIFICATION OF SUBTERRANEAN POLLUTANTS

FIELD OF THE INVENTION

This invention relates to pollution detection. Specifically, this invention relates to a system and method for automated remote detection and reporting of subterranean pollutants in liquid and gaseous form.

BACKGROUND OF THE INVENTION

Environmentally harmful chemicals are commonly utilized in industrial and commercial processes. Similarly, chemical wastes are commonly stored in man made storage tanks, containers and reservoirs. Although precautionary measures and controls such as impermeable liners are generally used, leaks or spills from such systems are common, resulting in migration of harmful materials into the subsurface soil and groundwater. Many release events go unidentified by the property owner and are not discovered until contaminants have spread a considerable distance from the source. Such pollution scenarios can result in property devaluation, regulatory compliance issues, legal challenges, and costly remediation requirements. Early detection and response to such spills and leaks can substantially reduce liabilities to such property owners.

In the past, environmental monitoring systems have been devised to detect leaks and fugitive emissions from various storage systems, processes, and conduits. Many such methods offer means of detecting release events, however there are presently no known efficient methods employed for, remote, real time monitoring of chemical releases to the subsurface. In particular there is no known means of automated remote, real-time monitoring for early detection of low level concentrations of volatile organic compounds (VOCs) associated with commercial facilities such as dry cleaners, printers, and automotive servicing facilities.

Without the means of continuous remote monitoring, it is the current practice to detect and quantify potential subsurface contamination by means of cumbersome investigative and subsurface sampling techniques that requires both onsite sampling and off-site analytical testing for contaminants and their concentrations.

There have been systems devised for environmental monitoring of fugitive chemical emissions from piping, as described in "Reversible Sensor for Detecting Solvent Vapors," U.S. Pat. No. 5,417,100 issued to Miller, et al. Similarly there are methods for measuring in line process gases, as described in "Continuous Monitoring of Organic Pollutants," U.S. Pat. No. 5,435,169 issued to Mitra. However, such methods were not developed or applied to the monitoring of chemical migration to the subsurface environment.

Additionally, leak detection methods, as described in "System for Detecting Leaks from Liquid-Containing Reservoirs and Conduits," U.S. Pat. No. 4,404,516 issued to Johnson, have been devised for monitoring storage tanks and reservoirs. However, those methods are limited to on-site systems that require facility operator response.

Other environmental monitoring systems have been devised for monitoring of chemical fugitive emissions at large industrial facilities. One such system, as described in "Soil Pollution Monitoring System," U.S. Pat. No. 4,618,855 issued to Harding, et al., actively pumps gases from the subsurface of the facility past a sensing device in order to detect the presence of vapor. This system relies on a vacuum pump to draw air and leakage gases through the ports and past sensors which detect the presence of gasoline, carbon monoxide, methane, ethanol, and other vapors. Accordingly, a ducting mechanism is required to force fresh air by the sensors periodically so as to clean the sensors before a new reading can be taken.

Environmental monitoring systems, as described in "Environment Monitoring System," U.S. Pat. No. 5,892,690, issued to Boatman, et al., utilize a data acquisition system for collecting and recording air quality data from remote locations. The data is accumulated and stored into a comprehensive database.

However, existing methods are not designed to monitor multiple facilities from a remote location with the capability of real-time detection of subterranean pollutants coupled with immediate notification to a third party of such a detection.

The present invention addresses these and other problems.

SUMMARY OF THE INVENTION

The present invention provides a system and method for automated remote real-time detection and reporting of subterranean chemical pollutants. The system is provided as part of a remote real time pollution detection and reporting service, particularly for customers owning, or responsible for, property where volatile organic compounds (VOC) are stored or utilized.

The system of the present invention includes a series of sensors placed in strategically located underground cavities beneath a property to detect chemical contamination caused by the release of chemical pollutants into the subsurface soil and groundwater. The relative placement of the sensors is determined by a number of factors. These factors include the rate of vapor flow diffusing through the native soil of the property, the volatility of the particular chemicals likely to be released on the property, and the location of likely sources of the chemical contaminants. These and other factors are well known in the art, and have been utilized in the past for determining the locations for collection of representative samples.

In accordance with one aspect of the invention, the sensors are housed within a perforated housing seated within a cavity beneath the surface of a property. The cavity functions as a mass flux chamber in order to maximize sensor response. The cavity is filled with a high porosity media, so as to provide separation between the native soil and the sensors, while minimizing resistance to the migration of chemical vapors to the sensors. Additionally, the high porosity media increases the surface area of contact between the subsoil and the sensors. The high porosity media may be glass or sand, although other materials well known in the art may be used in the alternative. The mass flux cavity facilitates the detection of the rate of change in concentrations of vapors migrating by diffusion through the soil environment.

In another aspect of the invention, a semi-permeable membrane surrounds the perforated housing. The membrane is utilized when the sensors are required to be placed in a moist or wet subsurface, for example in an area having a high water table. The membrane prevents liquids, such as water from penetrating through the housing into the sensor, while still allowing chemical vapors to pass through. This protection is necessary since liquid contact with the sensors may also skew any readings made by the sensors, and thus affect the accuracy of the chemical detection.

In a preferred embodiment, there are multiple sensors housed as an array within each perforated housing. The type of sensors used may vary, but are preferably of the type known as surface acoustic wave (SAW) sensors. A SAW sensor is a mass sensitive sensor that transmits an electric signal at a frequency which is effected by the presence of a particular chemical or chemicals. When a change in mass occurs at the surface of the sensor, the frequency of the signal changes accordingly. Among the SAW sensors contained in the array may be a reference sensor having a fixed operating frequency in the range of 100 MHz to 400 MHz. The remaining SAW sensors are selectively coated so as to react to various chemical vapors likely to be detected in the event of a leak on the property. The chemical selectively forms a weak bond to the coating in a process known in the art as sorption. Each sensor has a normal operating frequency, determined by the characteristics of the coating utilized. As a particular chemical vapor travels across the sensor, it attaches to the selective coating, changing the effective mass of the coating, which in turn alters the operating frequency of the sensor.

An important benefit of SAW sensors is their durability and reliability. Their operating frequencies and responses are initially set by a photolithographic process. The photolithographic process is a process known in the art for producing integrated circuits and printed circuit boards by photographing the circuit pattern on a photosensitive substrate and then chemically etching away the background. The SAW sensor frequency is generated at the site by oscillator circuits. As such, these sensors do not require tuning operations nor do they become de-tuned in the field. Additionally, the sorption process allows the sensor to be reusable, as the weak bonds formed with the chemical are easily broken by the introduction of heat. Thus the sensor is capable of functioning as a reusable event detector.

The composite acoustic response of the sensor array can be likened to a fingerprint. SAW sensors fall under the category of "smart sensors" that are capable of identifying the specific components as well as the concentration of a particular chemical within a sample. Conventional detectors, such as metal oxide semi-conductors, produce a broad response to a class of chemicals and physical conditions. In practice, conventional detectors alone often give false positive detection readings of a chemical leak. Consequently, an on-site visit and chemical analysis is required to confirm the reading. The use of SAW sensors facilitates the reliable and automated remote detection of specific chemical pollutants in a subsurface described in the present invention.

The preferred embodiment also includes an onsite computer processor connected to the various sensor arrays, which acts as a sensor interface. The computer processor has embedded within it software capable of reading the acoustic response, or fingerprint, of the SAW sensors. Additionally, a database is accessible by the software for identifying the specific sensor fingerprint of the chemical being detected by the sensor. The database may be stored within a data storage device housed within the computer, or be located on a remote computer, accessible by various means including the Internet. As such, the computer processor connects to a remote server computer, located at a remote monitoring station, that receives data from the onsite processor and may automatically report detection of a chemical release to a designated party. The software also provides a means for calibrating the sensors, performing functional status checks, and setting appropriate response thresholds from the remote server.

An important benefit of the onsite computer processor integrated with a remote server is the capability of continuous and automated monitoring of the property from a remote location. The utilization of a sensor array having SAW sensors, or a similar sensor device, in combination with a computer processor eliminates the need for onsite visits to the property to take samples from alternate sensing devices, which would usually require an offsite laboratory analysis.

The use of a remote monitoring station allows for immediate and automated monitoring of various sensor arrays located at multiple properties. When utilized as part of a pollution detection service, the remote monitoring station facilitates the immediate notification to third parties of a chemical pollutant in the subsurface of a property. The third party may be the owner of the property, or another designated entity responsible for responding to a chemical leak. In the preferred embodiment, this notification is provided as part of a subscribed service.

The foregoing has outlined some of the more pertinent objects of the present invention. These objects should be construed to be merely illustrative of some of the more prominent features and applications of the invention. Many other beneficial results can be attained by applying the disclosed invention in a different manner or by modifying the invention as will be described. Accordingly, other objects and a fuller understanding of the invention may be had by referring to the following Detailed Description of the Invention, which includes the preferred embodiment.

BRIEF DESCRIPTION OF THE DRAWINGS

These and other features and advantages of the invention will now be described with reference to the drawings of certain preferred embodiments, which are intended to illustrate and not to limit the invention, and in which.

DETAILED DESCRIPTION OF THE PREFERRED EMBODIMENT

In the following description, certain terminology will be employed for the sake of clarity and a particular embodiment described in accordance with the requirements 35 U.S.C. 112, but it is to be understood that the same is not to be limiting and should not be so construed in as much as the invention is capable of taking many forms and variations within the scope of the appended claims.

The present invention is a system for automated remote detection and reporting of subterranean chemical pollutants in the subsurface of a property.

Figure 1:
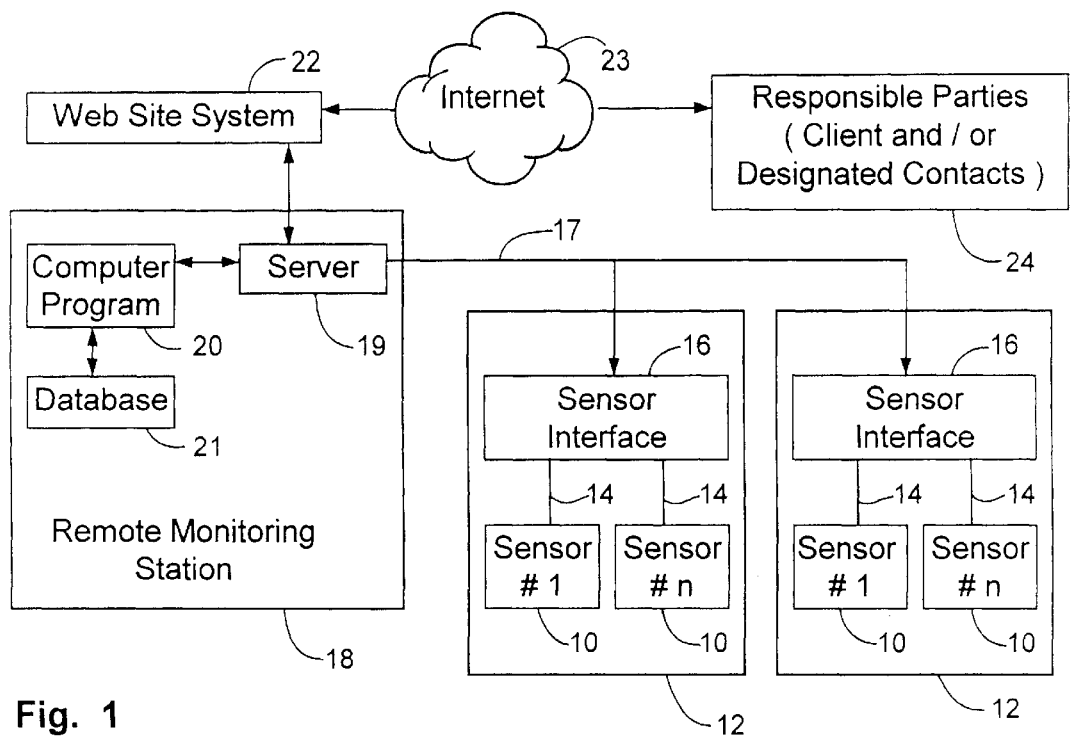
FIG. 1 is an architectural drawing and flow diagram illustrating the primary components of a system that operates in accordance with the present invention.

Referring now to FIG. 1 in particular, there is illustrated the primary components of a system that operates in accordance with the present invention. The system includes multiple sensors 10 located beneath the surface of a real property 12 wherein detection of subterranean chemical pollutants is desired. The sensors 10 are arranged in an array 14 connected to a sensor interface 16. The sensor interface 16 may be a computer processor, utilizing embedded software, located on the site of the real property 12. The computer processor may also be networked to other processors at other sites, that interface with a computer server 19 located at a remote monitoring station 18. As utilized herein, the terms computer server and sensor interface are used to describe a model of interaction in a distributed system in which a program at one site sends information to a program at another site and waits for a response. The requesting program at the site is the software utilized by the sensor interface and the program which responds and reacts to the information is called the "server." Communications lines 17, such as telephone lines or broadband cable connect the various sensor interfaces 16 with the remote monitoring station 18. Various other means known in the art for long range transport of data may also be utilized, examples of which may include satellite relay or wireless digital communication.

When a chemical pollutant is detected by the sensors 10 on the property 12, the sensor interface 16 processes the data generated by the sensors and communicates this information to the remote monitoring station 18. The chemical pollutant is detected when the sensor interface 16 identifies a significant change in concentrations of vapors migrating to the sensors 10. Following the release of a contaminant to the sub-surface, contaminant concentrations at the release point skyrocket from trace levels to extremely high concentrations approaching the vapor pressure of the contaminant. The contaminant vapor then spreads into the soil environment by gaseous diffusion. The rate of change in concentrations of vapors migrating by diffusion can be described to those skilled in the art by Fick's Second Law. The following relationship is a one-dimensional expression of Fick's Law:

$$\frac{\delta C}{\delta t} = D \frac{\delta^2 C}{\delta x^2}$$

Where C=vapor pressure concentration,
t=time,
D=effective diffusion coefficient, and
x=distance from the source of the vapor; such that $$\frac{\delta C}{\delta t}$$

is the change in vapor pressure concentration over time, and $$\frac{\delta^2 C}{\delta x^2}$$

is the derivative of concentration gradient over distance.

A solution to the partial differential equation is an exponential function:

$$C_{(x,t)} = C_0 \mathrm{erfc}(x/2(Dt)^{1/2})$$

where, erfc is the complementary error function.

Figure 2:
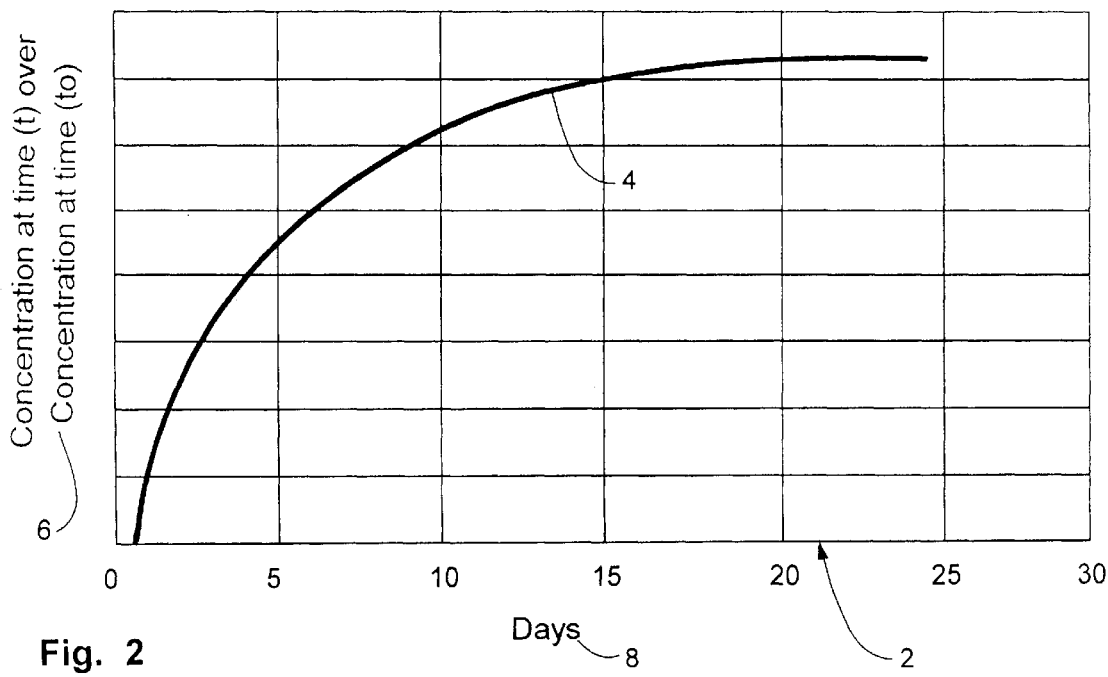
FIG. 2 is a graphical representation of the relationship between VOC concentration and time.

A graphical presentation of the rate of change in concentration at a distance of six feet from a contamination source location is illustrated by way of example in the graph shown in FIG. 2.

The graph 2 illustrates the logarithmic relationship 4 between concentration at time (t) over concentration at time ($t_0$) 6 and time as measured in days 8. Such steep changes in sensor 10 response are strictly attributable to migration of vapors in response to a subterranean pollution event. Other potential patterns in sensor 10 response which are not indicative of pollution events are discernable from a pollution event because they do not present such a logarithmic relationship 4. By way of example, diurnal changes in temperature may produce a cyclical relationship, differentiated by the logarithmic relationship 4 indicative of a pollution event.

Referring again to FIG. 1 the server 19 located at the remote monitoring station 18 utilizes a computer program 20 to process the data received from the sensor interfaces 16. The program 20 identifies the rate of change in concentration of migrating vapors and the composition of the chemical detected by the sensors 10 by analyzing the data retrieved by the sensors 10 in comparison with a sensor response database 21. The sensor response database 21 may include a library of sensor responses to known mixtures of vapors and a library of historical sensor responses at the particular site. Additionally, the computer program 20 may contain an algorithm designed to interpret the responses as release events, when analyzed with the data contained in the database 21. The server 19 transfers this data to a Web site system 22 for electronic notification to a responsible party 24 such as the owner of the property 12 or other designated entity. The electronic notification is processed through the Internet 23 to an email address of the responsible party 24. In the alternative, the responsible party 24 may access the Web site system 22 using a secure and confidential Internet 23 connection where detection reports of the property 12 are periodically updated. The remote monitoring station 18 may also dispatch appropriate remedial measures to counteract the leak that has been detected.

The Web site system 22 is a computer system that serves informational content over a network using the standard protocols of the World Wide Web. The Web site corresponds to the particular Internet domain name utilized by the detection service provider described herein, and includes content associated with the particular detection service provider. As used herein, the term Web site system is generally intended to encompass both the server components that serve the informational content over the network, and the back end components that interact with the server components to perform services for Web site users.

The term Internet as used herein is used to describe a collection of interconnected networks that are linked together by a set of standard protocols to form a global, distributed network. While this term is intended to refer to what is now commonly known as the Internet, it is also intended to encompass variations which may be made in the future, including changes and additions to existing standard protocols.

Although the embodiment described herein uses Web technology and the Internet to post and communicate pollutant detection, any of a variety of communication means can be utilized to transmit the notification of pollution detection. For example, the remote monitoring station 18 may transmit a facsimile message to the responsible party 24, or telephone call, or overnight mail. These means of notification are meant to be illustrative and are not intended to be limiting. The notification is provided as part of a subscribed service provided by the remote monitoring station 18, for which the owner of the property 12 or other desiring entity pays a subscription fee.

Figure 3:
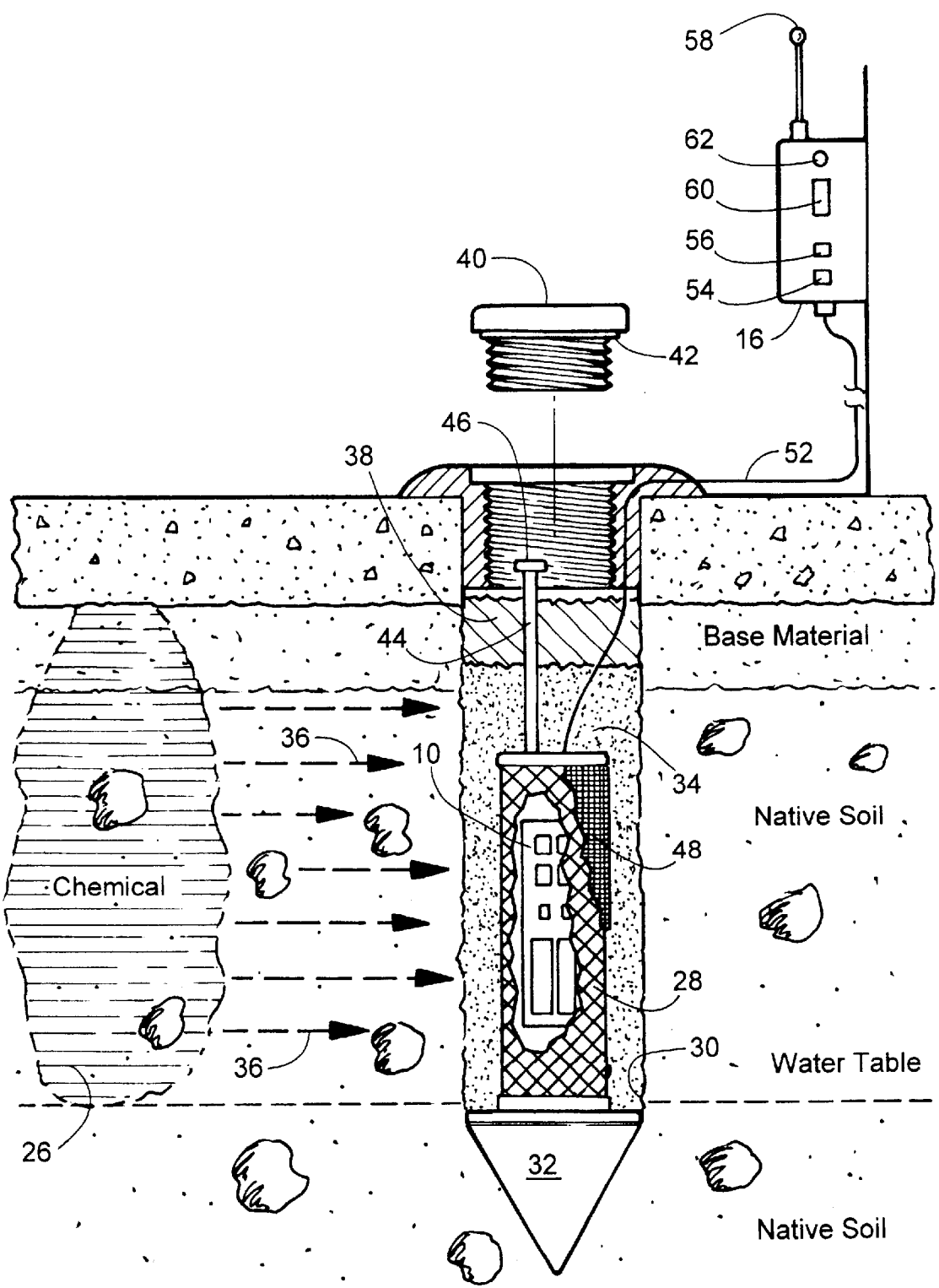
FIG. 3 is a cross sectional view of the on-site portion of the system utilized in accordance with the present invention.

As further illustrated in FIG. 3, the sensors 10 are seated within a cavity 30 strategically located in the subsurface of the property where detection of a chemical pollutant 26 is desired. The strategic location of the sensors 10 is determined by a number of factors. These factors may include the rate of diffusive migration through the native soil of the property 12, the volatility of the particular chemicals likely to be released on the property 12, and the precise location of the potential leak source. These and other factors are well known in the art, and have been utilized in the past for determining the location of placement of sampling locations for soil vapor.

The sensors 10 are housed within a perforated housing 28 that is seated within the cavity 30. The perforated housing 28 may be made of a mesh like material that acts to separate the sensors 10 from the surrounding materials, while still permitting vapors to pass through to the sensors 10 unimpeded. The cavity 30 acts as a mass flux chamber that facilitates the flow of chemical vapors 36 to the sensors 10, while also providing a means of separating the sensors 10 from the surrounding soil. The cavity 30 may be filled with a high porosity media 34. The function of this media 34 is to prevent direct contact of the sensors 10 with the surrounding native soil. However, it should be noted that the high porosity media 34 should be of a particular material such that the migration rate 36 of a polluting chemical 26 is not impeded. Additionally, the high porosity media 34 increases the surface area of contact between the subsoil and the sensors 10. The material to be used may include glass or sand, however it is to be understood that other similar high porosity mediums well known in the art may be utilized to fill the cavity 30, such that a mass flux chamber is created.

The cavity 30, acting as a mass flux chamber, magnifies the expected rate of change (shown by example in FIG. 2) by exposing a large surface area to native soils, possessing a relatively small internal volume, and being closed to potential contaminants such as surface air that would interfere with sensor 10 detection. Pollution events occurring in the presence of low levels of contaminant vapor, as in locations where a pollution event occurred in the past, display the rapid initial rates of change illustrated in FIG. 2 by utilization of the sensors 10 within a mass flux chamber described in the present invention.

The housing 28 may sit on a push point 32 that may be used to create the cavity 30. The push point 32 may be a conically shaped solid metallic object commonly used in the art for creating a cavity when driven into a surface. The push point 32 provides a self-boring means for creating the cavity 30 as well as provides a stable surface on which the housing 28 may rest. Additionally, the push point 32 provides an air tight seal to the bottom of the cavity 30 such that other underground vapors may not diffuse upward to the sensors 10. Although the use of a push point 32 is advantageous, other means known in the art for creating an air tight cavity in the subsurface may also be utilized. Such means may include drilling a hole in the surface and thereafter sealing the bottom with an air tight sealer such as caulk or cement.

It is important that the cavity 30 be sealed from the surface, so as to prevent interference with vapors that may be present in the above-surface air. Accordingly, an impermeable sealing compound 38, such as caulk, may be utilized to seal the opening of the cavity 30 above the housing 28, and below the surface of the property. Other materials similar to caulk and well known in the art may also be utilized to place an air tight seal above the cavity 30. Similarly, a vapor tight access port 40 utilizing an O-ring 42 for additional assurance of an air tight seal, may be placed above the cavity 30 on the surface of the property. The access port 40 provides a means for accessing the sensors 10 and housing 28 for any desired repair or adjustment. Additionally, the access port 40 provides access to a vapor sampling port 44. The vapor sampling port 44 provides access to the sensors 10 in the event that a manual sampling is desired. The sampling port 44 has a stop valve 46 to assure that polluting vapors 36 do not accidentally or incidentally escape between manual sampling intervals.

Although manual sampling may be desired from time to time, a novel aspect of the present invention is the utilization of a remote computer system to monitor the sensor 10 activity. This remote monitoring is accomplished by networking multiple sensor interfaces 16 that are coupled to the sensors 10. The means of coupling an electronic sensor 10 to the sensor interface 16, which may be a computer processor, are well known in the art, and include wireless (not shown) or wire connections 52. The sensor interface 16 provides a means for monitoring and calibrating the sensors 10 from a remote location by communicating with a server 19 (shown in FIG. 1) on the remote location via various client-server connection methods well known in the art, including a RS-232 port 54, a parallel port 56, or wireless interface 58. It is to be understood that various alternative client-server connection methods may utilized herein, and may include connections commonly known in the art as telephone jacks, Ethernet ports, and modem antennas. Additionally, a serial port 60 may be provided so that a technician may perform an onsite analysis of the data retrieved by the sensors, by attaching a secondary processing device to the serial port 60. Such devices are well known in the art and include laptop computers, and miniaturized computer processors commonly sold under the trademark "Palm Pilot." A power port 62 may be provided on the interface 16 so as to supply the sensor 10 with electrical current. Although, alternate power supplies well known in the art may also be utilized, including battery and solar power.

When the present invention is utilized within a wet subsurface environment, it is necessary to protect the sensors 10 from coming into contact with any surrounding water, or other ambient liquid. In this application, the sensor housing 28 may be enveloped by a semi-permeable membrane 48. This prevents liquids from penetrating through the housing 28 while still allowing chemical vapors 36 to pass through. Various materials well known in the art may be utilized as the membrane 48, such that a liquid medium is prevented from penetrating through the membrane 48 but gaseous vapors are allowed to pass with minimal resistance. This protection is necessary as liquid contact with the sensors 10 may skew the readings made by the sensors, and thus effect the accuracy of the chemical detection.

Figure 4:
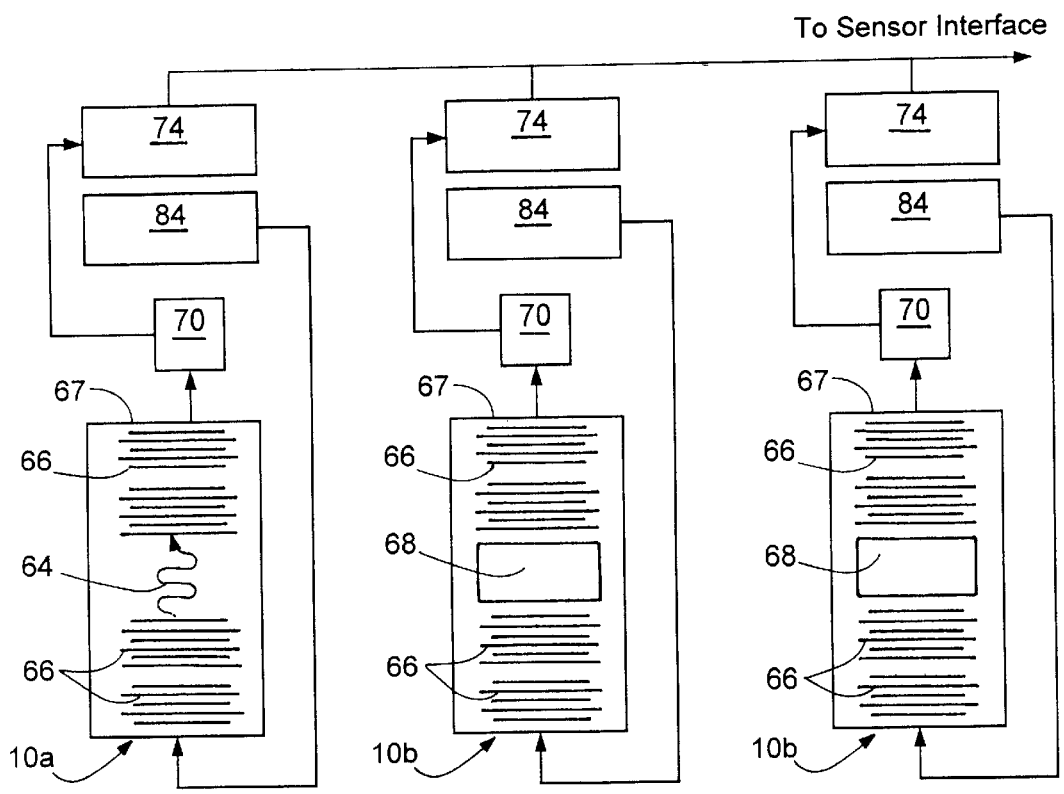
FIG. 4 is a close up perspective view of the sensor array that operates in accordance with the present invention.

FIG. 4 illustrates a close up perspective view of the sensors 10 that operate in accordance with the preferred embodiment. The type of sensor 10 illustrated and preferred is a surface acoustic wave (SAW) sensor. Alternate conventional detectors well known in the art, such as metal oxide semi-conductors that produce a general response to numerous chemicals and physical conditions, may also be used. However, the use of SAW sensors is preferred because it facilitates the automated remote detection of chemical pollutants 26 in a subsurface described in the preferred embodiment and is more reliable than alternate sensors, such as metal-oxide sensors. Additionally, SAW sensors may operate at low temperatures, which limits interfering effects of the surrounding soil, including regular heating and drying of the soil, as well as the thermally induced convective movement of inert soil gases. These interfering effects can skew results when utilizing convention sensors, leading to undependable interpretations. The sensors 10 are arranged in a sensor array, which includes one or more SAW sensors 10b and at least one reference SAW sensor 10a. The SAW sensor produces an acoustic wave 64 that travels across the sensor. The frequency of the wave is initiated by an oscillator circuit 84. A series of interdigital transducers (IDTs) 66 are placed on the piezoelectric substrate 67 of the sensor 10. IDTs 66 are a series of collinear electrodes, well known in the art, that are placed on the piezoelectric substrate 67 for the precise purpose of launching a surface acoustic wave. Although the use of a piezoelectric substrate 67 is preferred, other substrates known in the art that possess a noncentrosymmetric crystal structure capable of generating an electric charge on the application of a mechanical stress may be used.

In the preferred embodiment, the reference sensor 10a will have a surface acoustic wave 64 of a predetermined frequency in the range of 100 MHz to 400 MHz, initiated by the oscillator circuit 84, so as to distinguish it from the other sensors 10b in the array. The other sensors 10b in the array are coated with a selective coating 68 for attracting a specific chemical vapor whose detection is desired. The selectively coated sensors 10b are calibrated to produces a surface acoustic wave 64 of a different frequency than that of the reference sensor 10a. As the particular chemical vapor in question comes into contact with the selective coating 68 of the sensor 10b, the mass of the sensor changes. Accordingly, the surface acoustic wave frequency is altered. The rate of change of the vapor concentration, as detected by the frequency change in the SAW sensors 10 and described by Fick's Law above, allows the sensor interface 16 and server 19 to immediately identify the nature of the pollution event.

The selectively coated sensors 10b bind with the chemical vapors by a process known in the art as sorption. Sorption interactions are generally weak physical bonds of less than about 40 kJ/mole. Bonding forces in this range are similar in energy to heats of condensation. Sorption can be reasonably expected under conditions that favor condensation, such as low surface temperatures. Similarly, as in evaporative processes, the desorption of the selected chemical vapor can occur, which makes the surface interaction reversible. As such the selectively coated sensors 10b are reusable, as controllable environmental aspects such as temperature, may be altered to allow the desorption of the VOCs.

The coatings of the sensors 10b are typically organic films with an affinity for a target VOC that is generated by the presence of functional groups on the coating that interact selectively at temperatures above the condensation point. Accordingly, both qualitative and quantitative information regarding the levels and type of contamination are capable by utilizing the selectively coated sensors 10b in combination with temperature and frequency control devices.

As further detailed in FIG. 4 the signal produced by the SAW sensors 10a and 10b each independently pass through a high frequency amplifier 70 so as to distinguish the signal from that of any noise produced from surrounding circuitry. This results in a cleaner signal. The signal outputs 72 of the various sensors 10 are passed through a mixer 74 commonly used in the art to produce an intermediate frequency signal (not shown) so that they may be read by a low frequency counter 76 for processing by the onsite sensor interface 16.

Figure 5:
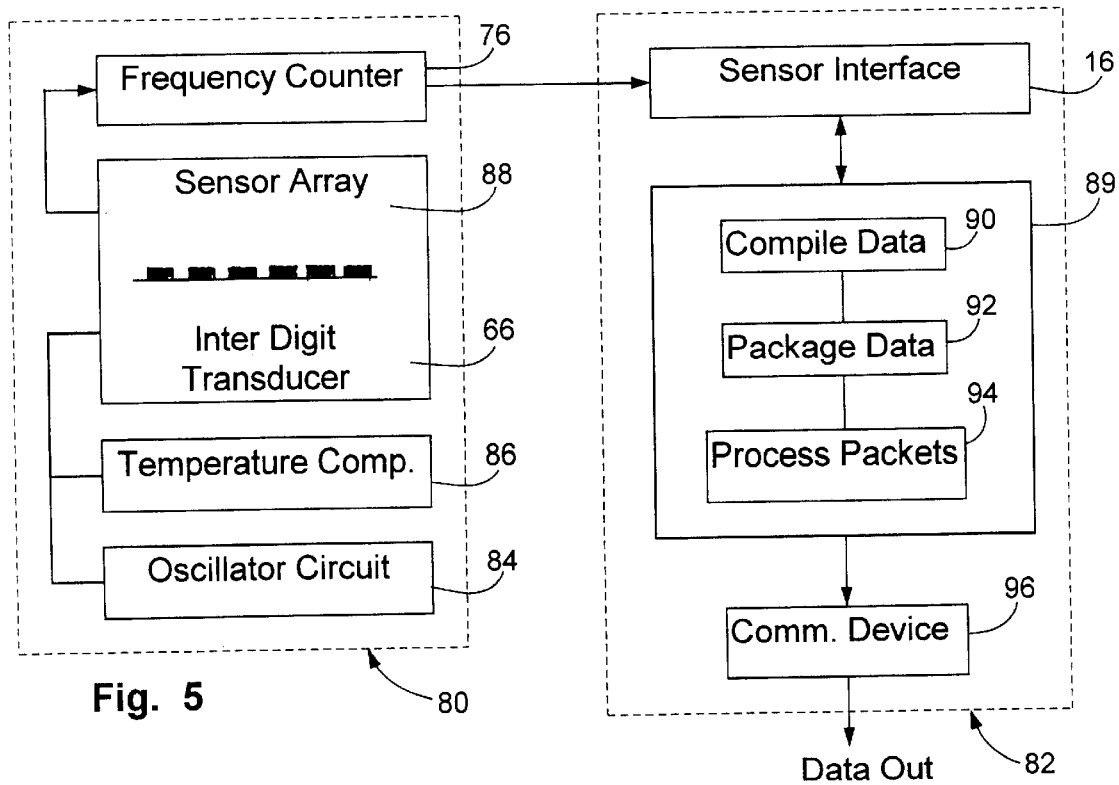
FIG. 5 is a flow diagram illustrating the chemical detection and reporting sequence in accordance with the present invention.

Turning now to FIG. 5 there is illustrated a flow diagram of the utilization of the electronic data produced by the sensors in the sensing and reporting of a chemical leak. The procedure can be divided into a Sensing Process 80 and a Processing and Notification Process 82. The sensing process 80 utilizes an oscillator circuit 84 for setting the operating frequency of the sensors. A temperature compensator 86 maintains the sensors at a constant temperature so as to minimize any effects the surrounding temperature may have on the frequency of the acoustic wave. This in turn allows the SAW sensor to be more effective in detecting the rate of change in concentration of chemical vapors. The IDTs 66 are utilized to launch a surface acoustic wave across the surface of the SAW sensors arranged in the sensor array 88 at a frequency initiated by the oscillator circuit 84. Any change in the frequency resulting from the attachment of a vapor-phase chemical to the specially coated SAW sensors described in referencing FIG. 4 is registered by the frequency counter 76.

The sensor interface 16 is utilized to process the data registered by the frequency counter 76 in the Processing and Notification Process 82. The sensor interface 16 may be a computer microprocessor commonly utilized in the art for compiling and processing data in electronic form. The computer microprocessor is utilized in conjunction with embedded software 89 to compile data 90 registered by the frequency counter 76. The data is packaged 92 and processed 94 by the embedded software. The data is then transmitted to the remote monitoring station by means of a communication device 96 which may be a modem or other similar data transmission device commonly utilized in the art. The sensor interface 16 maintains its own operating system and logic software to control and record information from the sensors. The purpose of processing the data on site by means of the sensor interface 16 is to be able to compress and arrange the data in such a manner so as to facilitate the rapid and efficient transmission of the data to the remote monitoring station. The raw data is of such a size that to transmit it to the remote monitoring station without onsite processing by the sensor interface would be ineffective and time consuming. Additionally, the software utilized by the sensor interface 16 allows the sensor interface to recognize a pollution event by the rapid change in concentration of the VOCs detected by the sensors 10, so that such an event may be immediately and automatically reported to the remote monitoring station 18.

Figure 6:
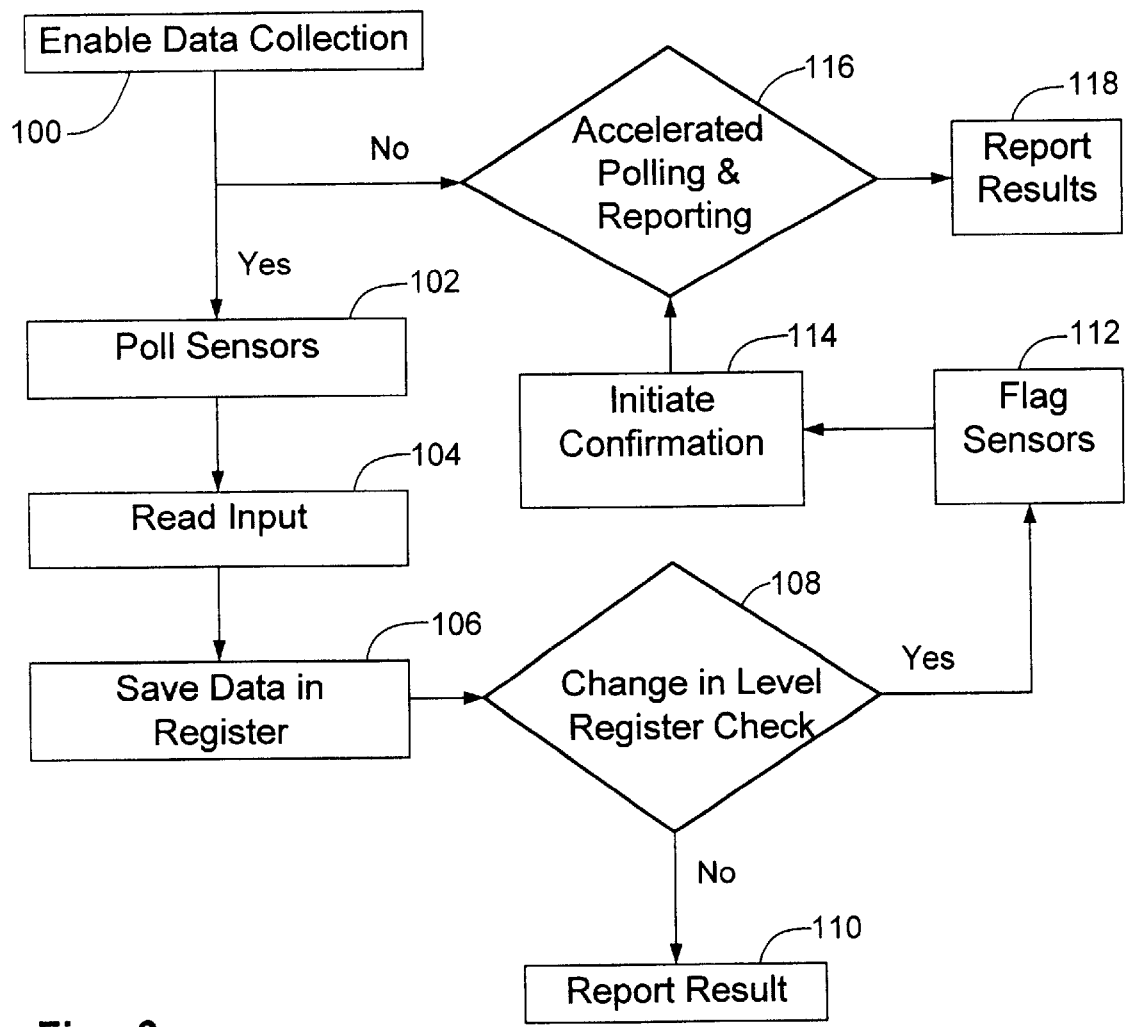
FIG. 6 is a flow diagram illustrating the sequence of steps required to retrieve and report data by the onsite processor of the present invention.

Referring now to FIG. 6, there is shown a flow diagram illustrating the steps involved in the software utilized by the computer processor of the sensor interface 16. The software enables the data collection 100, wherein the sensors 10 are polled 102 by the processor. The data retrieved from the sensors is read 104 and saved in a register 106. Any change in the registered frequency is monitored 108. If no change is detected, the resulting report is transmitted 110 to the remote monitoring station. If a change in frequency is detected, signifying a change in vapor concentration, the sensors registering the change in frequency are flagged 112, and a confirmation of the frequency change is initiated 114. This confirmation involves the accelerated polling and reporting 116 of the affected sensors, such that a result report 118 is transmitted to the remote monitoring station of a pollution event.

While the invention has been described herein with reference to certain preferred embodiments, these embodiments have been presented by way of example only, and not to limit the scope of the invention. Accordingly, the scope of the invention should be identified only in accordance with the claims that follow.

We claim:

1. A system for automated detection of subterranean pollutants from a remote location, the system comprising:

a sensor seated within a subterranean cavity, such that said cavity is surrounded by native soil;

a sensor interface coupled to said sensor for polling the sensor and storing information received;

a communication apparatus for communicating said information to a remotely located computer system; and a means for informing a responsible party of said information communicated to said remotely located computer system.

2. The system of claim 1 wherein said sensor is comprised of a sensor array.

3. The system of claim 2 wherein said sensor array is comprised of a plurality surface acoustic wave sensors.

4. The system of claim 3 further comprising a reference surface acoustic wave sensor having a set operating frequency.

5. The system of claim 1 wherein said cavity forms a mass flux chamber.

6. The system of claim 1 wherein said sensor is housed within a perforated housing, said housing seated within said cavity.

7. The system of claim 6 wherein said perforated housing is enveloped by a semi-permeable membrane, such that liquid is prevented from contacting said sensor and vapor is allowed to permeate through said membrane.

8. The system of claim 1 wherein a vapor sampling port having a stop valve for onsite sampling of chemical vapors extends from the sensor through an impermeable sealing compound to an opening on the surface, said opening accessible through a vapor tight access port.

9. The system of claim 5 wherein said cavity is filled with a high porosity media, such that said media does not provide resistance to migration of chemical vapors to the perforated housing from the surrounding soil.

10. The system of claim 9 wherein the high porosity media is comprised of glass or sand.

11. The system of claim 1 wherein said sensor interface is comprised of a computer processor having a software program for onsite processing of data retrieved from said sensor, such that said data may be electronically communicated to a remote monitoring station by means of said communications apparatus.

12. The system of claim 11 wherein said computer processor is further comprised of a means for on site display of data retrieved from said sensor.

13. The system of claim 1 wherein said communications apparatus communicates with a Web site system operated and managed by said remotely located computer system, such that said sensors are monitored and calibrated.

14. The system of claim 1 wherein said means of communicating to a responsible party is comprised of an electronic message delivered over a web based medium, facsimile, or a telephonic message.

15. The system of claim 1 wherein said sensor detects a rate of change of vapor concentration of volatile organic compounds.

16. An automated detection system for remote monitoring of subterranean pollutants, the system comprising:

a server connectable to a network of computers;

a plurality of sensors seated within a subterranean cavity;

a computer processor coupled to said plurality of sensors, for automated processing of data retrieved from sensors; and an electronic means of reporting said data processed by said computer processor to said server.

17. The system of claim 16 wherein said server is comprised of a software program for continuous and automatic monitoring and calibration of said sensors.

18. The system of claim 16 wherein said sensors are comprised of a plurality of selectively coated surface acoustic wave sensors and a reference surface acoustic wave sensor.

19. The system of claim 18 wherein said reference surface acoustic wave sensor has a set operating frequency.

20. The system of claim 16 wherein said cavity forms a mass flux chamber.

21. The system of claim 16 wherein said plurality of sensors is housed within a perforated housing seated within cavity.

22. The system of claim 21 wherein said perforated housing is enveloped by a semi-permeable membrane, such that liquid is prevented from contacting said sensors and vapor is allowed to permeate through said membrane.

23. The system of claim 16 wherein a vapor sampling port having a stop valve for onsite sampling of chemical vapors extends from the sensors through an impermeable sealing compound to an opening on the surface, said opening accessible through a vapor tight access port.

24. The system of claim 16 wherein said cavity is filled with a high porosity media, such that said media does not provide resistance to migration of chemical vapors to the perforated housing from the surrounding soil.

25. The system of claim 22 wherein the high porosity media is comprised of glass or sand.

26. The system of claim 16 wherein a Web site system facilitates the reporting of said information from said computer processor to said server.

27. A method for remote detection of subterranean chemical pollutants in a dry subsurface, the method comprising:

seating a perforated sensor housing within a sealed subterranean cavity;

housing a plurality of sensors within said sensor housing;

providing a means for chemical vapors to migrate through said sensor housing to said plurality of sensors;

coupling a sensor interface to said sensors for polling the sensors and storing information received; and providing a server for automated remote monitoring of said information stored by said sensor interface.

28. The method of claim 27 further comprising generating and transmitting to a designated party information received by said sensor interface.

29. The method of claim 27 wherein providing a means for chemical vapors to migrate through said sensor housing comprises surrounding said perforated housing with a high porosity media, such that said high porosity media fills said cavity and forms a mass flux chamber.

30. The method of claim 27 further comprising providing a means for onsite display of said information.

31. A method for remote detection of subterranean chemical pollutants in a wet subsurface, the method comprising:

seating a perforated sensor housing within a sealed subterranean cavity;

housing a plurality of sensors within said sensor housing;

providing a liquid impermeable means for chemical vapors to migrate through said sensor housing to said plurality of sensors;

coupling a sensor interface to said sensors for polling the sensors and storing information received; and providing a server for automated remote monitoring of said information stored by said sensor interface.

32. The method of claim 31 further comprising generating and transmitting to a designated party information received by said sensor interface.

33. The method of claim 31 wherein providing a liquid impermeable means for chemical vapors to migrate through said sensor housing comprises surrounding said perforated housing with a semi-permeable membrane, such that liquid is prevented from contacting said sensors and vapor is allowed to permeate through said membrane.

34. The method of claim 31 further comprising providing a means for onsite display of said information received from said sensors.

35. The method of claim 31 further comprising surrounding said perforated housing with a high porosity media, such that said high porosity media fills said cavity and forms a mass flux chamber.

36. A method for delivering a subterranean pollution detection service to a customer, the method comprising:

a means for automated detection of a subterranean pollutant beneath a property;

a means for reporting said detection to a remote detection service provider; and a means for said detection service provider to inform a responsible party of said detection.

37. The method of claim 36 further comprising a means for manual onsite confirmation of said subterranean pollutant.

38. The method of claim 36 wherein said means for automated detection is comprised of seating a sensor housing within a subterranean cavity sealed from the surface, housing a plurality of sensors within said sensor housing, providing a means for chemical vapors to migrate through said sensor housing to said plurality of sensors, coupling a sensor interface to said sensors for polling the sensors and storing information received, and providing a server for automated remote monitoring of said information stored by said sensor interface.

39. The method of claim 36 wherein said means for reporting said detection is comprised of sending an electronic message through a computer based network.

40. The method of claim 36 wherein said means for informing said responsible party of said subterranean pollutant is comprised of sending an electronic message through a computer network.

41. The method of claim 39 wherein the reporting of said information from said sensor interface to said server is facilitated by a Web site system.

42. The method of claim 36 further comprising subscribing said customer to said detection service, said service renewable at a set time interval.

43. The method of claim 36 further comprising providing said customer access to a Web site system which contains information about detection of said subterranean pollutants.

44. The method of claim 36 further comprising electronically paying for said detection service by said customer.

* * * * *